US012807834B2

(12) United States Patent
Takeda et al.

(10) Patent No.: US 12,807,834 B2
(45) **Date of Patent: *Nov. 24, 2026**

(54) COATING COMPOSITION FOR ELECTRICAL STEEL SHEET, ELECTRICAL STEEL SHEET, LAMINATED CORE, AND ROTARY ELECTRIC MACHINE

(71) Applicant: NIPPON STEEL CORPORATION, Tokyo (JP)

(72) Inventors: Kazutoshi Takeda, Tokyo (JP); Shinsuke Takatani, Tokyo (JP); Minako Fukuchi, Tokyo (JP); Ichiro Tanaka, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 459 days.

This patent is subject to a terminal disclaimer.

(21) Appl. No.: 18/010,555

(22) PCT Filed: Jun. 17, 2021

(86) PCT No.: PCT/JP2021/023049

§ 371 (c)(1),
(2) Date: Dec. 15, 2022

(87) PCT Pub. No.: WO2021/256538

PCT Pub. Date: Dec. 23, 2021

(65) Prior Publication Data

US 2023/0257622 A1 Aug. 17, 2023

(30) Foreign Application Priority Data

Jun. 17, 2020 (JP) ................................ 2020-104235

(51) Int. Cl.

| | |
|---|---|
| ***C09D 163/00*** | (2006.01) |
| ***B32B 7/12*** | (2006.01) |
| ***B32B 15/04*** | (2006.01) |
| ***B32B 15/18*** | (2006.01) |
| ***C09D 5/00*** | (2006.01) |
| ***H01F 1/18*** | (2006.01) |
| ***H02K 1/02*** | (2006.01) |
| ***H02K 1/06*** | (2006.01) |

(52) U.S. Cl.

CPC .............. *C09D 163/00* (2013.01); *B32B 7/12* (2013.01); *B32B 15/043* (2013.01); *B32B 15/18* (2013.01); *C09D 5/00* (2013.01); *H01F 1/18* (2013.01); *H02K 1/02* (2013.01); *H02K 1/06* (2013.01); *B32B 2255/06* (2013.01); *B32B 2255/26* (2013.01); *B32B 2603/00* (2013.01)

(58) Field of Classification Search

CPC .......... C09D 163/00; C09D 5/00; B32B 7/12; B32B 15/043; B32B 15/18

See application file for complete search history.

(56) References Cited

U.S. PATENT DOCUMENTS

| | | | | |
|---|---|---|---|---|
| 3,966,837 | A | 6/1976 | Riew et al. | |
| 4,487,806 | A * | 12/1984 | Sellstrom | C08G 59/5033 523/400 |
| 5,049,596 | A | 9/1991 | Fujimoto et al. | |
| 5,248,400 | A | 9/1993 | Franks et al. | |
| 5,264,503 | A | 11/1993 | Marx | |
| 2007/0087201 | A1 | 4/2007 | Wimmer et al. | |
| 2014/0327329 | A1 | 11/2014 | Kitada | |
| 2016/0230024 | A1 | 8/2016 | Nakagawa et al. | |
| 2016/0375658 | A1 | 12/2016 | Kim et al. | |
| 2017/0117758 | A1 | 4/2017 | Nakagawa et al. | |
| 2017/0320994 | A1* | 11/2017 | Arita | C09K 5/14 |
| 2018/0122573 | A1 | 5/2018 | Fluch et al. | |
| 2018/0350492 | A1 | 12/2018 | Nishimizu et al. | |
| 2019/0097503 | A1* | 3/2019 | Ushida | H02K 15/03 |
| 2019/0160786 | A1 | 5/2019 | Nakagawa et al. | |
| 2019/0225758 | A1 | 7/2019 | Hirota et al. | |
| 2019/0367746 | A1 | 12/2019 | Takeda et al. | |
| 2020/0102454 | A1 | 4/2020 | Kang et al. | |
| 2021/0171813 | A1 | 6/2021 | Kaneko | |

FOREIGN PATENT DOCUMENTS

| | | | | |
|---|---|---|---|---|
| CN | 1383446 | A | 12/2002 | |
| CN | 103975506 | A | 8/2014 | |
| EP | 0 232 021 | A2 | 8/1987 | |
| EP | 3527620 | A1 * | 8/2019 | C08G 59/4021 |
| EP | 3 770 226 | A1 | 1/2021 | |
| EP | 3 902 106 | A1 | 10/2021 | |
| JP | S52-37934 | A | 3/1977 | |
| JP | 54-164456 | U | 11/1979 | |
| JP | 8-24779 | A | 1/1996 | |

(Continued)

OTHER PUBLICATIONS

Machine Translation of Ota (JP 2017149801 A) (Year: 2017).*

*Primary Examiner* — Callie E Shosho
*Assistant Examiner* — Bethany M Miller
(74) *Attorney, Agent, or Firm* — Birch, Stewart, Kolasch & Birch, LLP

(57) ABSTRACT

An electrical steel sheet used for a laminated core is an electrical steel sheet including an insulation coating 3 on a surface of a base steel sheet 2, the insulation coating being coated with a coating composition for an electrical steel sheet. The coating composition for an electrical steel sheet contains an epoxy resin, a first curing agent including an alkylphenol, and a second curing agent including either one or both of a phenol resol resin and a phenol novolac resin formulated in specific proportions.

9 Claims, 5 Drawing Sheets

(56) References Cited

FOREIGN PATENT DOCUMENTS

| | | | | |
|---|---|---|---|---|
| JP | 11-162723 | A | | 6/1999 |
| JP | 11-162724 | A | | 6/1999 |
| JP | 11-193475 | A | | 7/1999 |
| JP | 11-193476 | A | | 7/1999 |
| JP | 2000-173816 | A | | 6/2000 |
| JP | 2000-336487 | A | | 12/2000 |
| JP | 2002-38279 | A | | 2/2002 |
| JP | 2006-96928 | A | | 4/2006 |
| JP | 2006-351409 | A | | 12/2006 |
| JP | 2008-518087 | A | | 5/2008 |
| JP | 4143090 | B2 | | 9/2008 |
| JP | 2014-96429 | A | | 5/2014 |
| JP | 2016-540901 | A | | 12/2016 |
| JP | 2017-11863 | A | | 1/2017 |
| JP | 2017149801 | A | * | 8/2017 |
| JP | 2018-518591 | A | | 7/2018 |
| JP | 2020-70393 | A | | 5/2020 |
| JP | 2020-186415 | A | | 11/2020 |
| KR | 10-2009-0055393 | A | | 6/2009 |
| KR | 10-2017-0021861 | A | | 2/2017 |
| KR | 10-2019-0022846 | A | | 3/2019 |
| KR | 10-2019-0097246 | A | | 8/2019 |
| TW | 201932303 | A | | 8/2019 |
| WO | WO 2004/070080 | A1 | | 8/2004 |
| WO | WO 2006/049935 | A1 | | 5/2006 |
| WO | WO 2010/146821 | A1 | | 12/2010 |
| WO | WO 2015/029828 | A1 | | 3/2015 |
| WO | WO 2017/085797 | A1 | | 5/2017 |
| WO | WO 2019/123885 | A1 | | 6/2019 |
| WO | WO 2019/184981 | A1 | | 10/2019 |

* cited by examiner

COATING COMPOSITION FOR ELECTRICAL STEEL SHEET, ELECTRICAL STEEL SHEET, LAMINATED CORE, AND ROTARY ELECTRIC MACHINE

TECHNICAL FIELD

The present invention relates to a coating composition for an electrical steel sheet, an electrical steel sheet, a laminated core, and a rotary electric machine. Priority is claimed on Japanese Patent Application No. 2020-104235, filed Jun. 17, 2020, the content of which is incorporated herein by reference.

BACKGROUND ART

A laminated core in which a plurality of electrical steel sheets are joined to each other and laminated is known as a core (iron core) used in a rotary electric machine. Caulking or welding is known as a method for joining electrical steel sheets to each other. However, in caulking or welding, the magnetic property (core iron loss) of electrical steel sheets is likely to deteriorate due to thermal strains or mechanical strains during processing.

A method for adhesion electrical steel sheets to each other on which insulation coatings having an adhesive capability are formed on their surfaces (Patent Document 1) is known as a joining method other than caulking and welding, for example. Since the adhesion using the insulation coating does not impart mechanical strains or thermal strains, it is superior in core iron loss compared with in caulking or welding. Epoxy resins have little volume change and have excellent heat resistance, oil resistance, and chemical resistance and are excellent as adhesives that bond electrical steel sheets to each other (Patent Documents 2 and 3).

CITATION LIST

Patent Documents

[Patent Document 1]
Japanese Unexamined Patent Application, First Publication No. 2017-011863
[Patent Document 2]
Japanese Unexamined Patent Application, First Publication No. 2000-173816
[Patent Document 3]
PCT International Publication No. WO2004/070080

SUMMARY OF THE INVENTION

Problems to be Solved by the Invention

In recent years, in response to a request for further improvement in motor efficiency, further reduction in core iron loss has been required. Thinning of electrical steel sheets is effective for reducing core iron loss. However, since the Young's modulus of a steel sheet decreases as the film thickness decreases, it is required for stress strain causing deterioration in iron loss not to be applied to the steel sheet. Since an epoxy resin has excellent heat resistance but is hard and has low toughness, stress strain is applied to a steel sheet due to hardening of the epoxy resin during adhesion. Therefore, thinning of the steel sheet causes deterioration in iron loss.

In addition, in drive motors or the like of electric vehicles, the temperature increases during driving, so that more heat resistance is required.

As techniques for improving heat resistance, there is a method for incorporating phenol resins. However, resins having excellent heat resistance are hard at normal temperature and a large stress is applied to a laminated core, so that the magnetic property deteriorates. On the other hand, resins having an appropriate hardness near normal temperature become soft at high temperature, and therefore are inferior in heat resistance. From these, it is difficult to achieve both an excellent magnetic property and excellent heat resistance that can maintain sufficient adhesion strength even in a state where the drive motors or the like are exposed to high temperature during driving.

An object of the present invention is to provide a coating composition for an electrical steel sheet that can achieve both a magnetic property of a laminated core and heat resistance that can maintain adhesion strength between electrical steel sheets even at a high temperature during driving, and an electrical steel sheet, a laminated core, and a rotary electric machine using the coating composition for an electrical steel sheet.

Means for Solving the Problem

The present invention has the following aspects.

[1] A coating composition for an electrical steel sheet according to one aspect of the present invention includes: an epoxy resin; a first curing agent including an alkylphenol; and a second curing agent including either one or both of a phenol resol resin and a phenol novolac resin, in which the amount of the first curing agent is 1.0 part by mass to 20.0 parts by mass with respect to 100 parts by mass of the epoxy resin.

[2] In the coating composition for an electrical steel sheet according to [1] above, the alkylphenols may include either one or both of a monoalkylphenol having an alkyl group with 2 to 20 carbon atoms and a dialkylphenol having an alkyl group with 2 to 20 carbon atoms.

[3] In the coating composition for an electrical steel sheet according to [1] or [2] above, the amount of the second curing agent may be 5.0 parts by mass to 150.0 parts by mass with respect to 100 parts by mass of the epoxy resin.

[4] In the coating composition for an electrical steel sheet according to any one of [1] to [3] above, a curing shrinkage rate may be 15% or less.

[5] In the coating composition for an electrical steel sheet according to any one of [1] to [4] above, a mass ratio represented by (amount of the first curing agent (A))/(amount of the second curing agent (B)) may be 0.01 to 4.0.

[6] An electrical steel sheet according to one aspect of the present invention having an insulating coating containing the coating composition for an electrical steel sheet according to any one of [1] to [5] above on a surface.

[7] A laminated core according to one aspect of the present invention, in which a plurality of the electrical steel sheets according to [6] above are laminated and caused to adhere together.

[8] A rotary electric machine according to one aspect of the present invention includes: the laminated core according to [7] above.

Effects of the Invention

According to the above-described aspects of the present invention, it is possible to provide a coating composition for an electrical steel sheet that can achieve both a magnetic property of a laminated core and heat resistance that can maintain adhesion strength between electrical steel sheets even at a high temperature during driving, and an electrical steel sheet, a laminated core, and a rotary electric machine using the coating composition for an electrical steel sheet.

EMBODIMENTS FOR IMPLEMENTING THE INVENTION

Hereinafter, a laminated core according to one embodiment of the present invention, a rotary electric machine including this laminated core, and a material forming this laminated core will be described with reference to the drawings. In the present embodiment, an electric motor, specifically an AC electric motor, more specifically a synchronous electric motor, and still more specifically a permanent-magnet field electric motor will be described as an example of a rotary electric machine. This type of electric motor is suitably adopted for electric vehicles, for example.

In addition, a lower limit value and an upper limit value are included in a numerical limit range described below with "to" in between. A numerical value represented by "less than" or "greater than" is not included in the numerical range.

Rotary Electric Machine 10

Figure 1:
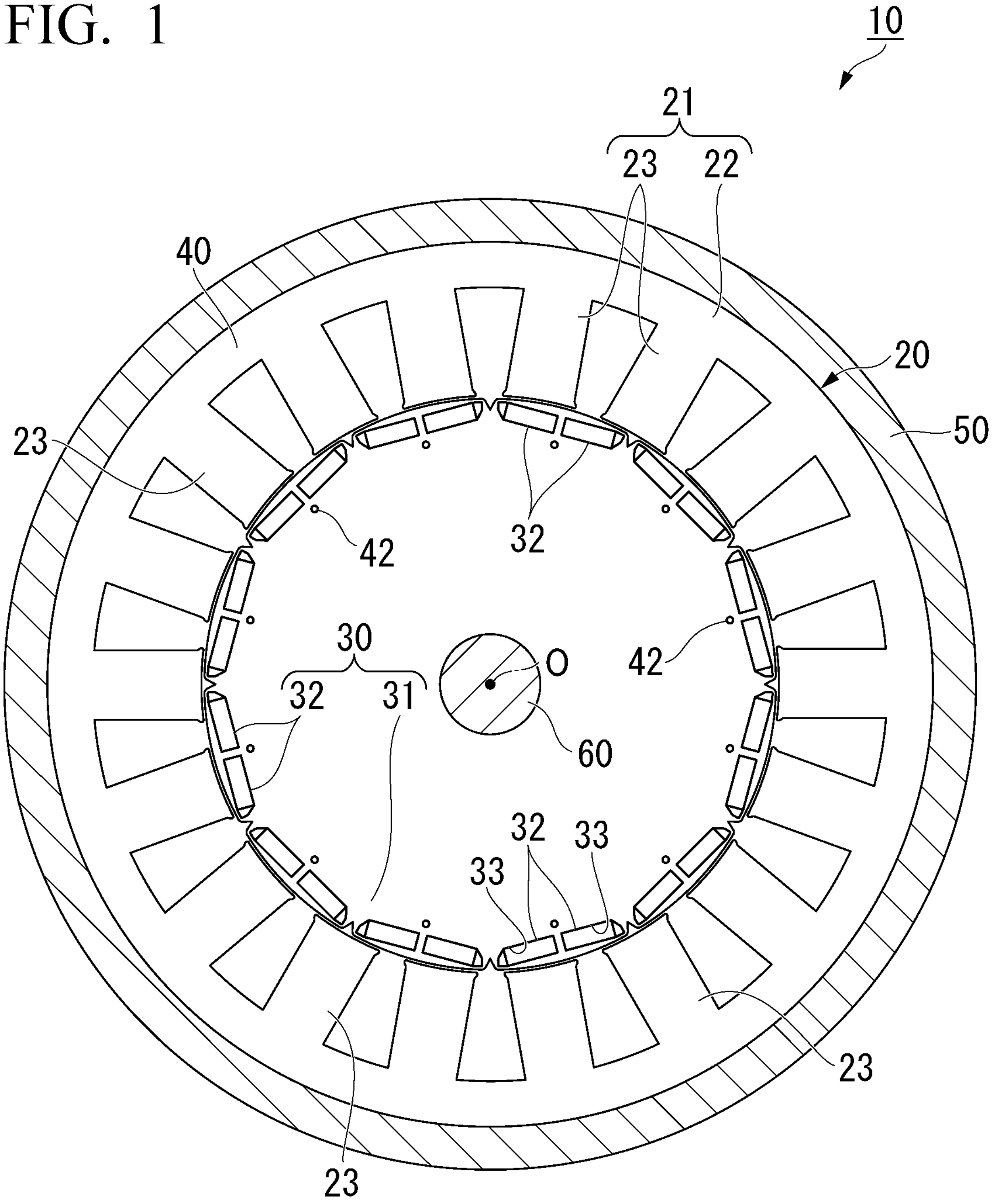
FIG. 1 is a cross-sectional view of a rotary electric machine including a laminated core according to a first embodiment of the present invention.

As shown in FIG. 1, a rotary electric machine 10 includes a stator 20, a rotor 30, a case 50, and a rotation shaft 60. The stator 20 and the rotor 30 are housed in the case 50.

The stator 20 is fixed in the case 50.

In the present embodiment, an inner rotor type is adopted for the rotary electric machine 10 in which the rotor 30 is located inside in the radial direction of the stator 20. However, an outer rotor type may be adopted for the rotary electric machine 10 in which the rotor 30 is located outside the stator 20. In addition, in the present embodiment, the rotary electric machine 10 is a 12-pole 18-slot three-phase AC motor. However, the number of poles, the number of slots, the number of phases, and the like can be appropriately changed.

The rotary electric machine 10 can rotate at a rotational speed of 1,000 rpm by applying an excitation current having an effective value of 10 A and a frequency of 100 Hz to each phase, for example.

The stator 20 includes an adhesive laminated core for a stator (hereinafter, stator core) 21 and a winding not shown in the drawing.

The stator core 21 includes a circular core back portion 22 and a plurality of teeth portions 23. Hereinafter, a direction of a central axis O of the stator core 21 (or the core back portion 22) is referred to as an axial direction, a radial direction (a direction orthogonal to the central axis O) of the stator core 21 (or the core back portion 22) is referred to as a radial direction, and a circumferential direction (a direction of revolving around the central axis O) of the stator core 21 (or the core back portion 22) is referred to as a circumferential direction.

The core back portion 22 is formed in an annular shape in a plan view of the stator 20 when viewed from the axial direction.

The plurality of teeth portions 23 protrude from the inner circumference of the core back portion 22 toward the inside in the radial direction (toward the central axis O of the core back portion 22 along the radial direction). The plurality of teeth portions 23 are arranged at equal angular intervals in the circumferential direction. In the present embodiment, 18 teeth portions 23 are provided at every 20 degrees of the central angle around the central axis O. The plurality of teeth portions 23 are formed to have the same shape and the same size as each other. Accordingly, the plurality of teeth portions 23 have the same thickness dimension as each other.

The winding is wound around the teeth portions 23. The winding may be concentrically or distributedly wound.

The rotor 30 is placed inside in the radial direction of the stator 20 (stator core 21). The rotor 30 includes a rotor core 31 and a plurality of permanent magnets 32.

The rotor core 31 is formed in a circular shape (annular shape) placed coaxially with the stator 20. The rotation shaft 60 is placed in the rotor core 31. The rotation shaft 60 is fixed to the rotor core 31.

The plurality of permanent magnets 32 are fixed to the rotor core 31. In the present embodiment, a set of two permanent magnets 32 forms one magnetic pole. The plurality of permanent magnets 32 are arranged at equal angular intervals in the circumferential direction. In the present embodiment, 12 sets (24 in total) of the permanent magnets 32 are provided at every 30 degrees of the central angle around the central axis O.

In the present embodiment, an embedded magnet motor is adopted as a permanent-magnet field electric motor.

A plurality of through-holes 33 penetrating the rotor core 31 in the axial direction are formed in the rotor core 31. The plurality of through-holes 33 are provided corresponding to the arrangement of the plurality of the permanent magnets 32. Each permanent magnet 32 is fixed to the rotor core 31 in a state where it is placed in a corresponding through-hole 33. The fixation of each permanent magnet 32 to the rotor core 31 can be realized, for example, by adhesion the outer surface of the permanent magnet 32 to the inner surface of a through-hole 33 with an adhesive. A surface magnet motor may be adopted as a permanent-magnet field electric motor instead of the embedded magnet motor.

Figure 2:
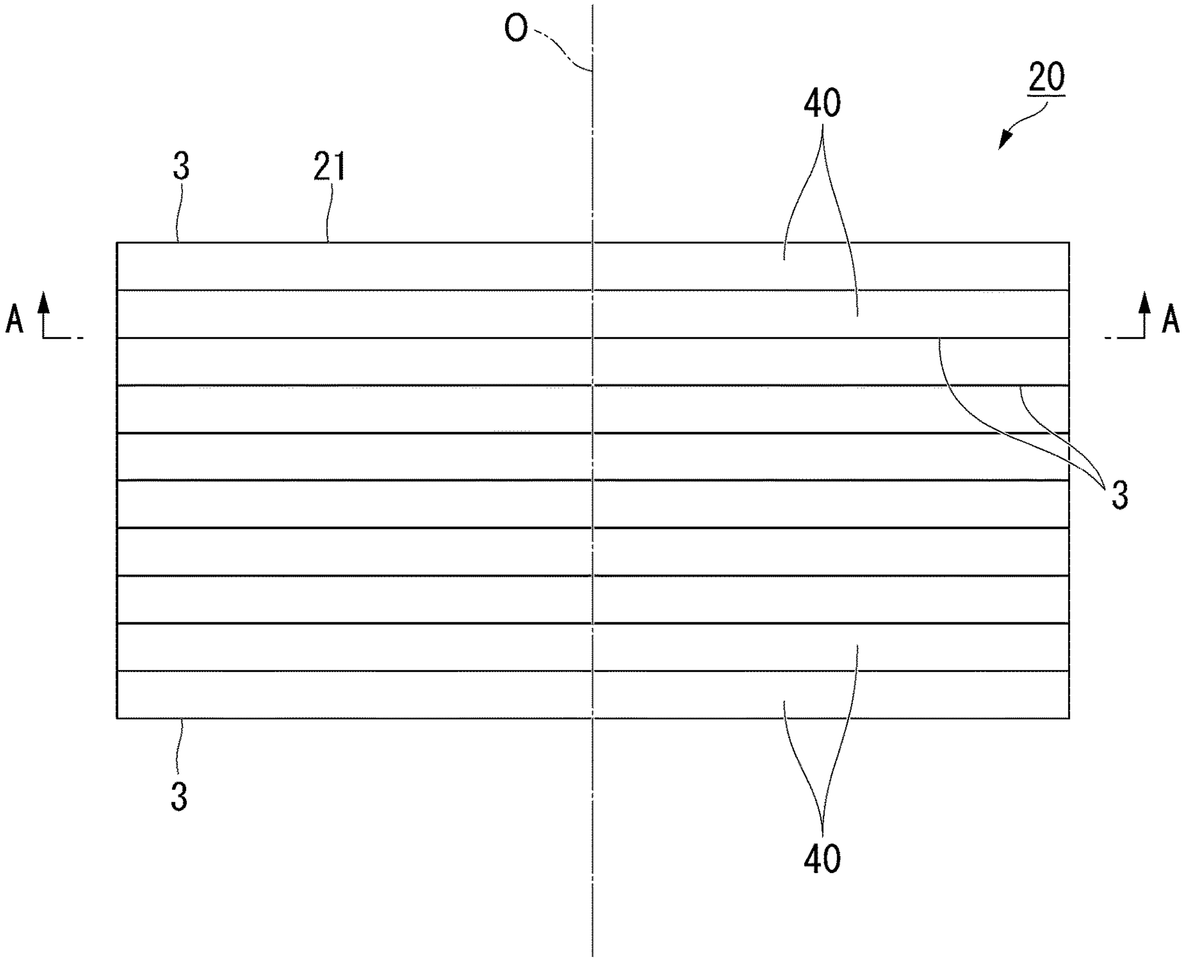
FIG. 2 is a side view of the laminated core shown in FIG. 1.

Both the stator core 21 and the rotor core 31 are laminated cores. For example, the stator core 21 is formed by laminating a plurality of electrical steel sheets 40 in the lamination direction as shown in FIG. 2.

The lamination thickness (the total length along the central axis O) of each of the stator core 21 and the rotor core 31 is, for example, 50.0 mm. The outer diameter of the stator core 21 is, for example, 250.0 mm. The inner diameter of the stator core 21 is, for example, 165.0 mm. The outer diameter of the rotor core 31 is, for example, 163.0 mm. The inner diameter of the rotor core 31 is, for example, 30.0 mm. However, these values are merely an example, and the lamination thickness, the outer diameter, or the inner diameter of the stator core 21 and the lamination thickness, the outer diameter, and the inner diameter of the rotor core 31 are not limited to these values. Here, the inner diameter of the stator core 21 is based on distal portions of the teeth portions 23 in the stator core 21. That is, the inner diameter of the stator core 21 is a diameter of a virtual circle inscribed in the distal portions of all the teeth portions 23.

Figure 4:
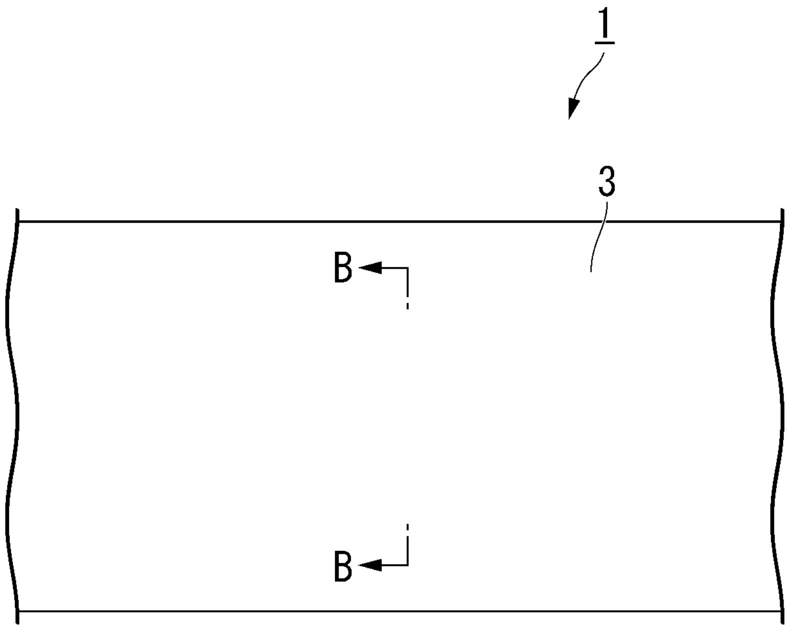
FIG. 4 is a plan view of a material for forming the laminated core shown in FIG. 1.
Figure 5:
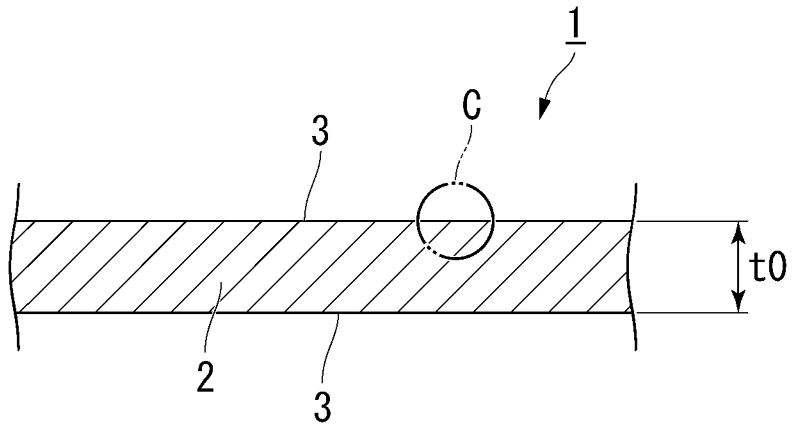
FIG. 5 is a cross-sectional view taken along line B-B of FIG. 4.
Figure 6:
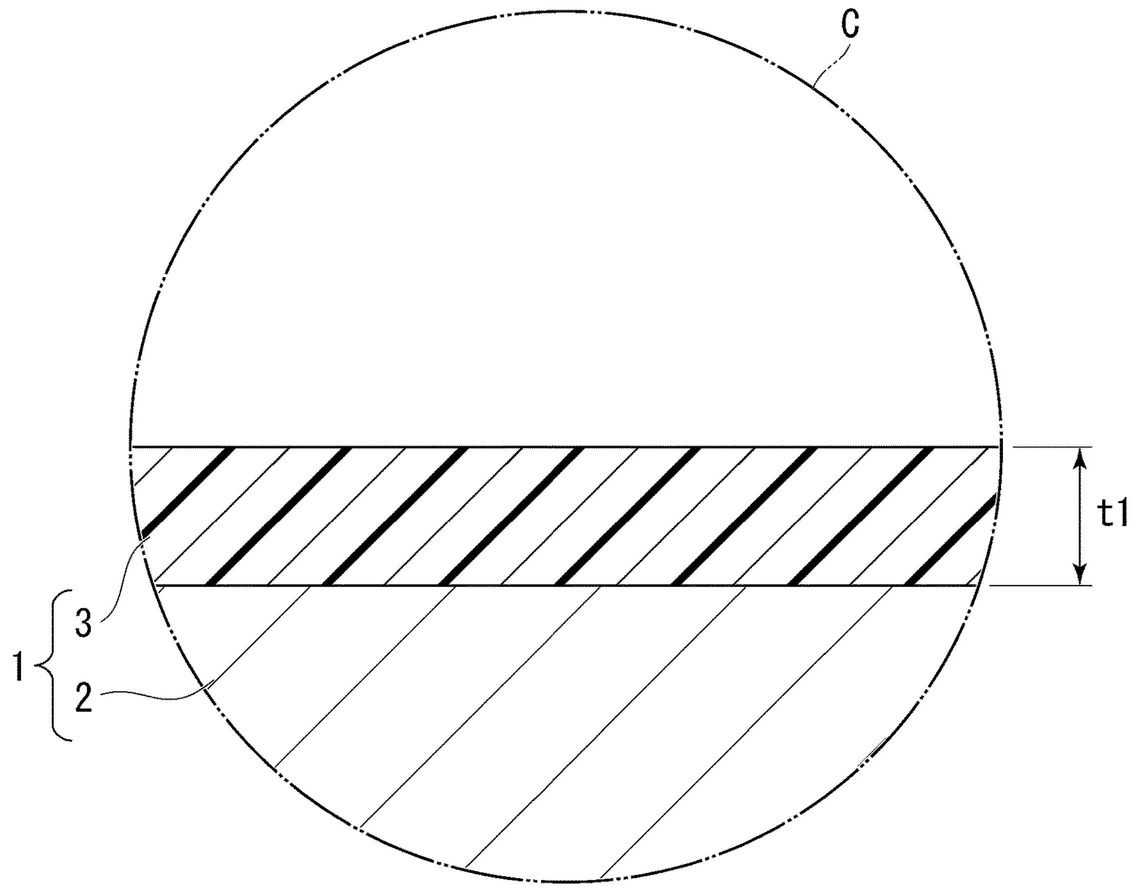
FIG. 6 is an enlarged view of a portion C of FIG. 5.

Each electrical steel sheet 40 forming the stator core 21 and the rotor core 31 is formed, for example, through punching a material 1 as shown in FIGS. 4 to 6. The material 1 is an electrical steel sheet that is a base material of the electrical steel sheets 40. Examples of the material 1 include a strip-like steel sheet or a cut sheet.

Although it is in the middle of explanation of the laminated core, the material 1 will be described below. In the present specification, a strip-like steel sheet that is a base material of the electrical steel sheets 40 is sometimes referred to as the material 1. Steel sheets having a shape used for a laminated core by punching the material 1 are sometimes referred to as the electrical steel sheets 40.

(Material 1)

Figure 7:
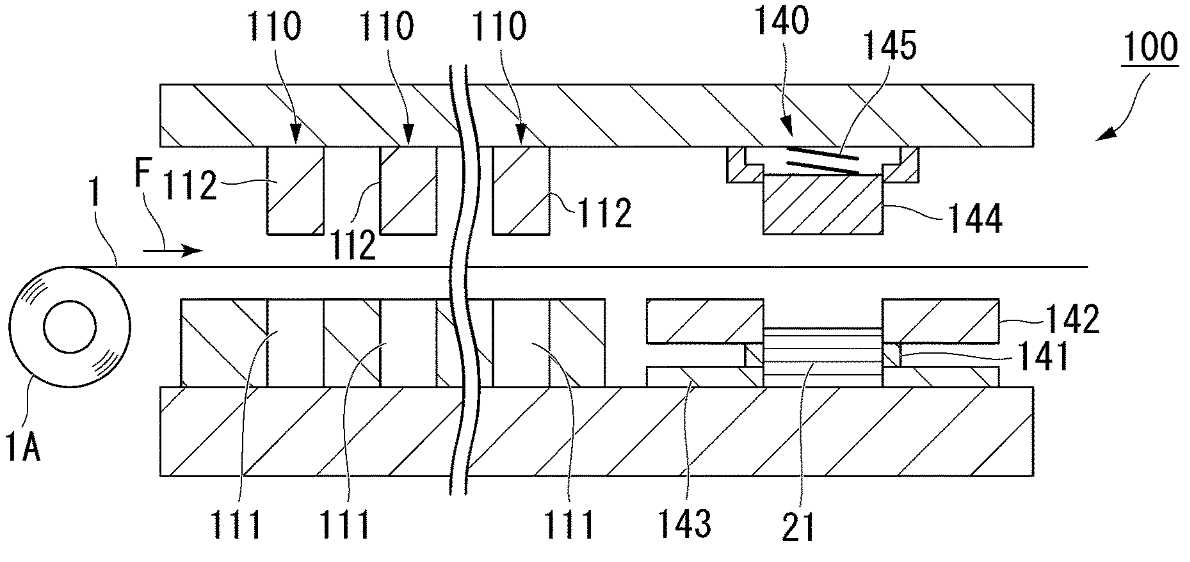
FIG. 7 is a side view of a manufacturing device used for manufacturing the laminated core shown in FIG. 1.

The material 1 is handled in a state where it is wound around a coil 1A shown in FIG. 7, for example. In the present embodiment, a non-oriented electrical steel sheet is adopted as the material 1. As the non-oriented electrical steel sheet, a non-oriented electrical steel sheet of JIS C 2552:2014 can be adopted. However, a grain-oriented electrical steel sheet may be adopted as the material 1 instead of the non-oriented electrical steel sheet. As the grain-oriented electrical steel sheet in this case, a grain-oriented electrical steel sheet of JIS C 2553:2019 can be adopted. In addition, a non-oriented thin electrical steel strip or a grain-oriented thin electrical steel strip of JIS C 2558:2015 can be adopted.

For example, upper and lower limits of an average sheet thickness t0 of the material 1 are set as follows in consideration of a case where the material 1 is used as the electrical steel sheet 40.

As the material 1 becomes thinner, the production cost of the material 1 increases. For this reason, when considering the production cost, the lower limit value of the average sheet thickness t0 of the material 1 is 0.10 mm, preferably 0.15 mm, and more preferably 0.18 mm.

On the other hand, if the material 1 is too thick, the production cost becomes favorable. However, in a case where the material 1 is used as the electrical steel sheet 40, eddy current loss increases and core iron loss deteriorates. For this reason, when considering the core iron loss and the production cost, the upper limit value of the average sheet thickness t0 of the material 1 is 0.65 mm, preferably 0.35 mm, and more preferably 0.30 mm.

For example, 0.20 mm may satisfy the above-described range of the average sheet thickness t0 of the material 1.

The average sheet thickness t0 of the material 1 includes not only the thickness of the base steel sheet 2 to be described below but also the thickness of an insulation coating 3. In addition, a method for measuring the average sheet thickness t0 of the material 1 is, for example, a measurement method below. For example, in a case where the material 1 is wound into a shape of the coil 1A, at least a part of the material 1 is unwound into a flat sheet shape. In the material 1 unwound into a flat plate shape, a predetermined position in the longitudinal direction of the material 1 (for example, a position separated from an edge of the material 1 in the longitudinal direction by 10% of the total length of the material 1) is selected. At this selected position, the material 1 is divided into five regions along the width direction thereof. The sheet thickness of the material 1 is measured at four locations that become boundaries of these five regions. An average value of the sheet thickness at four locations can be set to the average sheet thickness t0 of the material 1.

The upper and lower limits of the average sheet thickness t0 of this material 1 can be naturally adopted as upper and lower limits of the average sheet thickness t0 of the electrical steel sheet 40. A method for measuring the average sheet thickness t0 of the electrical steel sheet 40 is, for example, a measurement method below. For example, the lamination thickness of the laminated core is measured at four locations (that is, every 90 degrees around the central axis O) at equal intervals in the circumferential direction.

Each lamination thickness measured at the four locations is divided by the number of sheets of the electrical steel sheets 40 laminated to calculate the sheet thickness per sheet. The average value of the sheet thickness at four locations can be set to the average sheet thickness t0 of the electrical steel sheet 40.

As shown in FIGS. 5 and 6, the material 1 includes the base steel sheet 2 and the insulation coating 3.

The material 1 is formed by covering both surfaces of the strip-like base steel sheet 2 with the insulation coating 3. In the present embodiment, the majority of the material 1 is formed of the base steel sheet 2, and insulation coatings 3 thinner than the base steel sheet 2 are laminated on the surfaces of the base steel sheet 2.

The chemical composition of the base steel sheet 2 contains 2.5% to 4.5% of Si by mass % as shown below. By setting the chemical composition to be within this range, the yield strength of the material 1 (electrical steel sheet 40) can be set to, for example, 380 MPa to 540 MPa.

Si: 2.5% to 4.5%

Al: 0.001% to 3.0%

Mn: 0.05% to 5.0%

Remainder: Fe and Impurities

When the material 1 is used as the electrical steel sheet 40, the insulation coating 3 exhibit insulation performance between electrical steel sheets 40 adjacent to each other in the lamination direction. In addition, in the present embodiment, the insulation coating 3 has an adhesive capability and causes the electrical steel sheets 40 adjacent to each other in the lamination direction to adhere to each other. The insulation coating 3 may have a single-layer structure or a multi-layer structure. More specifically, the insulation coating 3 may have a single-layer structure having both the insulation performance and an adhesive capability or may have a multi-layer structure including a lower base insulation coating having excellent insulation performance and an upper base insulation coating having an excellent adhesion performance, for example. The "adhesive capability of the insulation coating 3" in the present embodiment means an ability capable of expressing an adhesion strength of greater than or equal to a predetermined value under a predetermined temperature condition in a laminate including a plurality of the electrical steel sheets 40 laminated with insulation coatings 3 sandwiched therebetween.

In the present embodiment, the insulation coating 3 covers both surfaces of the base steel sheet 2 without any gap over the entire surfaces. However, a partial layer of the insulation coating 3 may not cover both surfaces of the base steel sheet 2 without any gap as long as the above-described insulation performance or adhesive capability can be ensured. In other words, a partial layer of the insulation coating 3 may be intermittently provided on the surfaces of the base steel sheet 2. However, in order to ensure insulation performance, it is necessary for both surfaces of the base steel sheet 2 to be covered with the insulation coating 3 so that the entire surfaces of the base steel sheet 2 are not exposed. Specifically, in a case where the insulation coating 3 has a single-layer structure having both insulation performance and an adhesive capability without having a lower base insulation coating having excellent insulation performance, it is necessary for the insulation coating 3 to be formed over the entire surfaces of the base steel sheet 2 without any gap. On the other hand, in a case where the insulation coating 3 has a multi-layer structure including a lower base insulation coating having excellent insulation performance and an upper base insulation coating having an excellent adhesive capability, both the insulation performance and the adhesive capability can be obtained not only by forming both the lower base insulation coating and the upper base insulation coating over the entire surfaces of the base steel sheet 2 without any gap but also by forming the lower base insulation coating over the entire surfaces of the base steel sheet without any gap and intermittently providing the upper base insulation coating.

A coating composition constituting the lower base insulation coating is not particularly limited, but general treatment agents such as a chromic acid-containing treatment agent and a phosphate-containing treatment agent can be used, for example.

The insulation coating 3 having an adhesive capability is obtained such that a coating composition for an electrical steel sheet containing an epoxy resin, a first curing agent (A), and a second curing agent (B) is applied thereto.

The insulation coating made of the coating composition for an electrical steel sheet is in an uncured state or semi-cured state (stage B) before thermocompression-bonding during production of a laminated core, and exhibits an adhesive capability when a curing reaction proceeds through heating during the thermocompression-bonding. The coating composition for an electrical steel sheet may be used for forming an insulation coating with a single-layer structure, or may be used for forming an upper base insulation coating provided on a lower base insulation coating.

As the epoxy resin, a general epoxy resin can be used. Specifically, any epoxy resin having two or more epoxy groups in a molecule can be used without particular limitation. Examples of such epoxy resins include a bisphenol A-type epoxy resin, a bisphenol F-type epoxy resin, a phenol novolac-type epoxy resin, a cresol novolac-type epoxy resin, a triphenylmethane-type epoxy resin, an alicyclic epoxy resin, a glycidyl ester-type epoxy resin, a glycidyl amine-type epoxy resin, a hydantoin-type epoxy resin, an isocyanurate-type epoxy resin, an acrylic acid-modified epoxy resin (epoxy acrylate), a phosphorus-containing epoxy resin, and hydrogenated products or halides (such as a brominated epoxy resin) thereof. The epoxy resins may be used alone or a combination of two or more thereof may be used.

The amount of epoxy resin with respect to the total mass of the coating composition for an electrical steel sheet is, for example, preferably 30 to 90 mass %, more preferably 40 to 80 mass %, and still more preferably 50 to 70 mass %. When the amount of epoxy resin is greater than or equal to the above-described lower limit value, the adhesion strength of the electrical steel sheets 40 can be further enhanced. When the amount of epoxy resin is less than or equal to the above-described upper limit value, stress strain of the electrical steel sheets 40 can be further suppressed.

The first curing agent includes an alkylphenol.

The alkylphenol is not particularly limited, and examples thereof include cresol (such as o-cresol), ethylphenol (such as o-ethylphenol), propylphenol (such as p-propylphenol and p-isopropylphenol), butylphenol (such as p-butylphenol and p-sec-butylphenol), nonylphenol (such as p-nonylphenol), dodecylphenol (such as p-dodecylphenol), dimethylphenol (such as 2,3-dimethylphenol), diethylphenol (such as 2,3-diethylphenol), dibutylphenol (such as 2,6-di-sec-butylphenol), and trimethylphenol (such as 2,3,4-trimethylphenol). The alkylphenols may be used alone or a combination of two or more thereof may be used.

From the viewpoint of easily achieving both a magnetic property and heat resistance, the alkylphenol preferably includes either one or both of a monoalkylphenol having an alkyl group with 2 to 20 carbon atoms and a dialkylphenol having an alkyl group with 2 to 20 carbon atoms.

The number of carbon atoms of an alkyl group of a monoalkylphenol is more preferably 3 to 16 and still more preferably 4 to 12.

The number of carbon atoms of each of two alkyl groups of a dialkylphenol is more preferably 3 to 20 and still more preferably 4 to 12.

The amount of first curing agent (A) in the coating composition for an electrical steel sheet is 1.0 part by mass to 20.0 parts by mass with respect to 100 parts by mass of the epoxy resin. If the amount of first curing agent (A) is greater than or equal to the lower limit value, a laminated core with excellent heat resistance can be obtained. If the amount of first curing agent is less than or equal to the upper limit value, a laminated core with an excellent magnetic property can be obtained.

The lower limit value of the amount of first curing agent (A) is preferably 2.0 parts by mass or more and more preferably 3.0 parts by mass or more. The upper limit of the amount of first curing agent (A) is preferably 18.0, more preferably 16.0 parts by mass or less, and still more preferably 15.0 parts by mass or less.

The second curing agent (B) is one or more selected from a phenol resol resin and a phenol novolac resin. The phenol resol resin and the phenol novolac resin as the second curing agents have neither an alkyl group nor an alkoxy group in the phenol skeleton.

As the second curing agent (B), the phenol resol resin may be used alone, the phenol novolac resin may be used alone, and the phenol resol resin and the phenol novolac resin may be used in combination.

The total amount of second curing agent (B) in the coating composition for an electrical steel sheet is preferably 5.0 part by mass to 150.0 parts by mass with respect to 100 parts by mass of the epoxy resin. If the amount of second curing agent (B) is greater than or equal to the lower limit value, heat resistance can be ensured. If the amount of second curing agent (B) is less than or equal to the upper limit value, deterioration in magnetic property can be suppressed.

The upper limit of the amount of second curing agent (B) is preferably 5.0 parts by mass or more, more preferably 10.0 parts by mass or more, and still more preferably 20.0 parts by mass or more. The upper limit of the amount of second curing agent (B) is preferably 150.0 parts by mass or less, more preferably 100.0 parts by mass or less, and still more preferably 70.0 parts by mass or less.

The mass ratio (hereinafter, also referred to as an "A-to-B ratio") represented by (amount of first curing agent (A))/(amount of second curing agent (B)) is preferably 0.01 to 4.0. The A-to-B ratio is more preferably 0.1 or more and still more preferably 0.25 or more. In addition, the A-to-B ratio is more preferably 3.8 or less and still more preferably 3.5 or less. When the A-to-B ratio is within the range between the above-described upper limit and lower limit values, both the heat resistance and the suppression of stress strain can be favorably achieved.

The coating composition for an electrical steel sheet may contain components other than the epoxy resin, the first curing agent (A), and the second curing agent (B). Examples of the other components include an acrylic resin, curing agents other than the first curing agent (A) and the second curing agent (B), a curing promoter (curing catalyst), an emulsifier, and a defoaming agent. From the viewpoint of ensuring the adhesion strength, the coating composition for an electrical steel sheet does not contain inorganic fillers such as silica, alumina, and glass. The other components may be used alone or a combination of two or more thereof may be used.

The acrylic resin is not particularly limited. Examples of monomers used for acrylic resins include unsaturated carboxylic acids such as acrylic acid and methacrylic acid, and (meth)acrylates such as methyl (meth)acrylate, ethyl (meth) acrylate, n-butyl (meth)acrylate, isobutyl (meth)acrylate, cyclohexyl (meth)acrylate, 2-ethylhexyl (meth)acrylate, 2-hydroxyethyl (meth)acrylate, and hydroxypropyl (meth) acrylate. The (methacrylate) means an acrylate or a methacrylate. The acrylic resins may be used alone or a combination of two or more thereof may be used.

An acrylic resin may have a structural unit derived from monomers other than an acrylic monomer. Examples of other monomers include ethylene, propylene, and styrene. The other monomers may be used alone or a combination of two or more thereof may be used.

The glass transition point (Tg point) of an acrylic resin is not particularly limited, but the lower limit thereof is preferably −40° C. and more preferably −20° C. The upper limit of the Tg point of an acrylic resin is preferably 80° C. and more preferably 50° C.

In a case where the coating composition for an electrical steel sheet contains an acrylic resin, the amount of acrylic resin is not particularly limited and can be set to, for example, 1 mass % to 50 mass % with respect to the total amount of the epoxy resin and the acrylic resin. In a case where an acrylic modified epoxy resin or an acrylic monomer is contained, the same applies to the amount thereof.

In a case where an acrylic resin is used, an acrylic modified epoxy resin obtained by grafting an acrylic resin onto an epoxy resin may be used. The coating composition for an electrical steel sheet may contain a monomer that forms an acrylic resin.

Examples of the other curing agents include a latent epoxy resin curing agent that initiates a curing reaction through heating. Specific examples thereof include aromatic polyamines, acid anhydrides, dicyandiamide, boron trifluoride-amine complexes, and organic acid hydrazides. The other curing agents may be used alone or a combination of two or more thereof may be used.

The amount of the other curing agents in the coating composition for an electrical steel sheet is preferably 20 parts by mass or less and more preferably 10 parts by mass or less with respect to 100 parts by mass of the epoxy resin.

In general, epoxy resin adhesives with excellent heat resistance have a large Young's modulus near normal temperature when the adhesion strength at a high temperature is guaranteed, and stress is applied to a steel sheet to deteriorate the magnetic property (core iron loss). On the other hand, in a case of a resin composition having a moderate strength near normal temperature, the heat resistance deteriorates.

In the present embodiment, when an alkylphenol of the first curing agent (A) is used in combination with the second curing agent (B), a cured product has a structure having an alkyl group as a side chain. For this reason, the elastic modulus of the cured product decreases moderately, and the stress applied to the steel sheet is reduced, whereby a laminated core with an excellent magnetic property can be obtained. In addition, since phenol resins have excellent heat resistance, the heat resistance is also improved by using the first curing agent (A) and the second curing agent (B) in combination. Therefore, both a magnetic property and heat resistance can be achieved.

The curing shrinkage rate of the coating composition for an electrical steel sheet is preferably 15% or less, more preferably 12% or less, still more preferably 10% or less, and particularly preferably 8% or less. If the curing shrinkage rate is less than or equal to the upper limit value, the application of stress to a steel sheet is likely to be reduced and a laminated core with an excellent magnetic property is likely to be obtained.

The curing shrinkage rate is measured through a method according to JIS K 6941.

The insulation coating 3 can be formed, for example, by applying a coating composition for an electrical steel sheet to the surface of a base steel sheet and performing drying and baking.

The lower limit value of a reaching temperature during baking is preferably 120° C. or higher and more preferably 140° C. or higher. The upper limit value of a reaching temperature during baking is preferably 200° C. or lower and more preferably 180° C. or lower. If the reaching temperature is higher than or equal to the above-described lower limit value, the coating composition for an electrical steel sheet is sufficiently bonded to an electrical steel sheet and peeling-off is suppressed. If the reaching temperature is lower than or equal to the above-described upper limit value, curing of an epoxy resin can be suppressed and the adhesive capability of the coating composition for an electrical steel sheet can be maintained.

The lower limit value of baking time is preferably 5 seconds or longer and more preferably 10 seconds or longer. The upper limit value of baking time is preferably 60 seconds or shorter and more preferably 30 seconds or shorter. If the baking time is longer than or equal to the above-described lower limit value, the coating composition for an electrical steel sheet is sufficiently bonded to an electrical steel sheet and peeling-off is suppressed. If the baking time is shorter than or equal to the above-described upper limit value, curing of an epoxy resin can be suppressed and the adhesive capability of the coating composition for an electrical steel sheet can be maintained.

For example, upper and lower limits of an average thickness t1 of the insulation coating 3 may be set as follows in consideration of a case where the material 1 is used as the electrical steel sheet 40.

In a case where the material 1 is used as the electrical steel sheet 40, the average thickness t1 (the thickness of a single surface of the electrical steel sheet 40 (material 1)) of the insulation coating 3 is adjusted so that insulation performance and an adhesive capability between electrical steel sheets 40 laminated to each other can be ensured.

In a case of the insulation coating 3 having a single-layer structure, the average thickness t1 (the thickness of a single surface of the electrical steel sheet 40 (material 1)) of the entire insulation coating 3 can be set to, for example, 1.5 μm to 8.0 μm.

In a case of the insulation coating 3 having a multi-layer structure, the average thickness of a lower base insulation coating can be set to, for example, 0.3 μm to 2.5 μm, and preferably to 0.5 μm to 1.5 μm. The average thickness of an upper base insulation coating can be set to, for example, 1.5 μm to 8.0 μm.

Regarding a method for measuring the average thickness t1 of the insulation coating 3 in the material 1, the thicknesses of the insulation coating 3 at a plurality of locations can be obtained through the same idea as that of the average sheet thickness t0 of the material 1 and can be used to obtain the average of the thicknesses.

The upper and lower limits of the average thickness t1 of the insulation coating 3 of this material 1 can be naturally adopted as upper and lower limits of the average thickness t1 of the insulation coating 3 of the electrical steel sheet 40.

A method for measuring the average thickness t1 of the insulation coating 3 of the electrical steel sheet 40 is, for example, a measurement method below. For example, among a plurality of electrical steel sheets forming a laminated core, an electrical steel sheet 40 (an electrical steel sheet 40 of which the surface is exposed in the lamination direction) located on the outermost side in the lamination direction is selected. On the surface of the selected electrical steel sheet 40, a predetermined position (for example, a just intermediate (central) position between an inner circumferential edge and an outer circumferential edge in the electrical steel sheet 40) in the radial direction is selected. The thickness of the insulation coating 3 of the electrical steel sheet 40 at the selected position is measured at four locations (that is, every 90 degrees around the central axis O) at equal intervals in the circumferential direction. The average value of the thicknesses measured at the four locations can be set to the average thickness t1 of the insulation coating 3.

The reason why the average thickness t1 of the insulation coating 3 is measured in an electrical steel sheet 40 located on the outermost side in the lamination direction in this manner is because insulation coatings 3 are formed so that the thicknesses of the insulation coatings 3 hardly change at the lamination position along the lamination direction of electrical steel sheets 40.

The electrical steel sheets 40 are manufactured by punching the above-described material 1, and a laminated core (the stator core 21 or the rotor core 31) is manufactured using the electrical steel sheets 40.

(Method for Laminating Laminated Core)

Hereinafter, the description will return to the laminated core.

Figure 3:
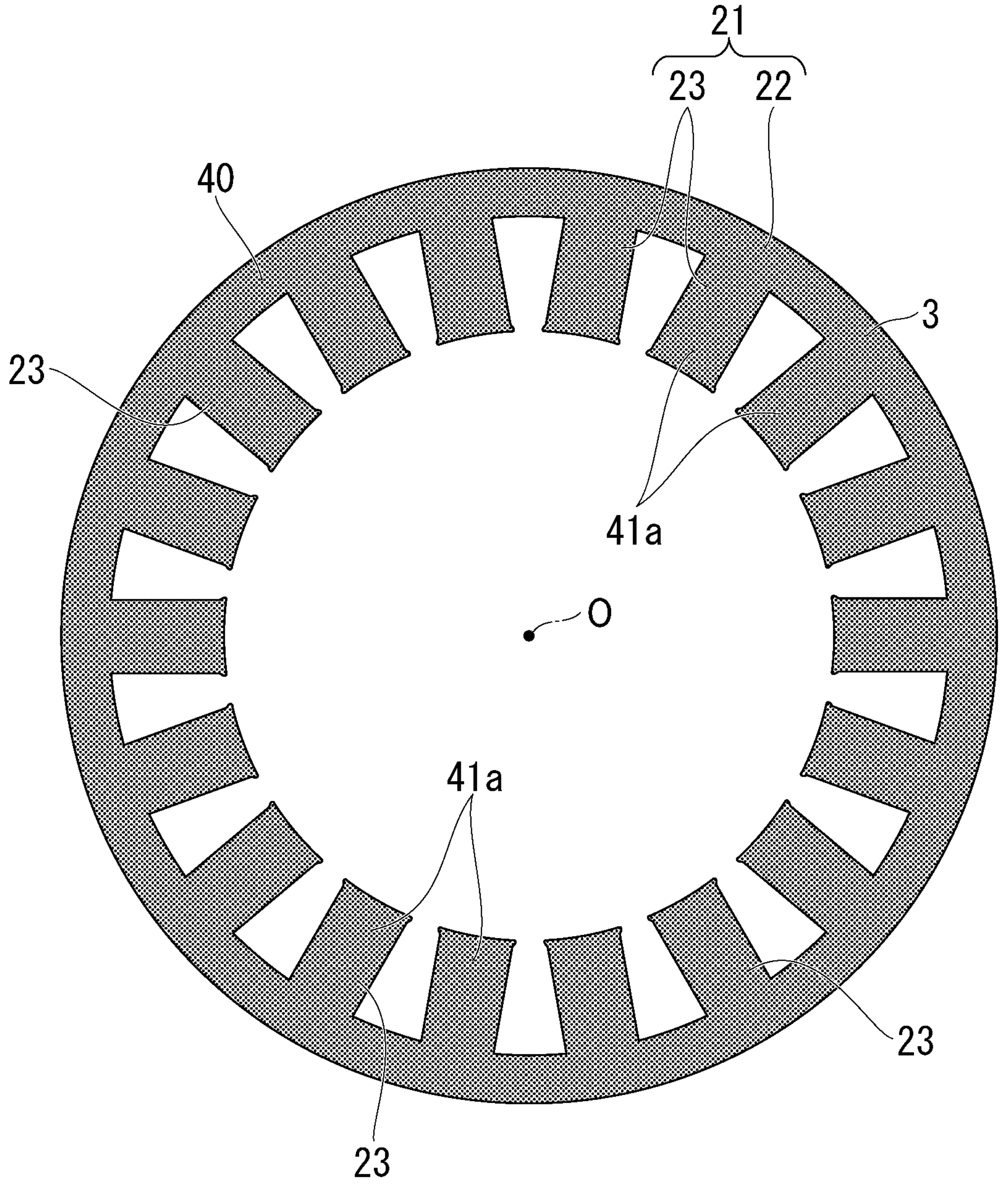
FIG. 3 is a cross-sectional view taken along line A-A of FIG. 2.

The plurality of the electrical steel sheets 40 forming the stator core 21 are laminated through the insulation coatings 3 as shown in FIG. 3.

The electrical steel sheets 40 adjacent to each other in the lamination direction are bonded to each other over the entire surface using the insulation coating 3. In other words, the surface (hereinafter, referred to as a first surface) of an electrical steel sheet 40 facing the lamination direction is an adhesive area 41*a* over the entire surface. However, the electrical steel sheets 40 adjacent to each other in the lamination direction may not be bonded to each other over the entire surface. In other words, the adhesive area 41*a* and a non-adhesive area (not shown in the drawing) may coexist on the first surface of the electrical steel sheet 40.

In the present embodiment, the plurality of the electrical steel sheets on the side forming the rotor core 31 are fixed to each other using caulk 42 (dowel) shown in FIG. 1. However, the plurality of the electrical steel sheets forming the rotor core 31 may also have a lamination structure fixed by the insulation coatings 3 similarly to the stator core 21.

In addition, the laminated core such as the stator core 21 or the rotor core 31 may also be formed through so-called rotary lamination.

(Method for Producing Laminated Core)

The stator core 21 is manufactured using a manufacturing device 100 shown in FIG. 7, for example. Hereinafter, in describing the manufacturing method, the laminated core manufacturing device 100 (hereinafter, simply referred to as the manufacturing device 100) will be described first.

In the manufacturing device 100, the material 1 is punched multiple times using dies arranged on each stage while sending the material 1 from the coil 1A (hoop) in the arrow F direction to gradually form the shape of the electrical steel sheets 40. Then, the punched electrical steel sheets 40 are laminated and pressurized while raising the temperature. As a result, the electrical steel sheets 40 adjacent to each other in the lamination direction are bonded to each other using the insulation coatings 3 (that is, portions located in the adhesive areas 41*a* in the insulation coatings 3 are made to exhibit an adhesive capability), and the adhesion is completed.

As shown in FIG. 7, the manufacturing device 100 includes multiple stages of punching stations 110. The punching stations 110 may have two stages or three stages or more.

Each stage of the punching stations 110 includes female dies 111 arranged below the material 1 and male dies 112 arranged above the material 1.

The manufacturing device 100 further includes a lamination station 140 at a downstream position of the most downstream punching station 110. This lamination station 140 includes a heating device 141, an outer circumference punching female die 142, a heat insulating member 143, an outer circumference punching male die 144, and a spring 145.

The heating device 141, the outer circumference punching female die 142, and the heat insulating member 143 are arranged below the material 1. On the other hand, the outer circumference punching male die 144 and the spring 145 are arranged above the material 1. The reference numeral 21 indicates a stator core.

In the manufacturing device 100 having the configuration described, first, the material 1 is sequentially sent from the coil 1A in the arrow F direction of FIG. 7. Then, this material 1 is sequentially punched by the multiple stages of the punching stations 110. The shape of the electrical steel sheet 40 having the core back portion 22 and the plurality of teeth portions 23 shown in FIG. 3 is provided to the material 1 through the punching processing. However, since the material is not completely punched at this point in time, the process proceeds to the next step along the arrow F direction.

Finally, the material 1 is sent to the lamination station 140, punched by the outer circumference punching male die 144, and laminated with high accuracy. During this lamination, the electrical steel sheet 40 receives a constant pressing force due to the spring 145. By sequentially repeating the punching process and the lamination step described above, a predetermined number of electrical steel sheets 40 can be stacked. Furthermore, a laminated core formed by stacking the electrical steel sheets 40 in this manner is heated to, for example, a temperature of 200° C. using the heating device 141. By this heating, the insulation coatings 3 of the adjacent electrical steel sheets 40 are bonded to each other (adhesion step).

The heating temperature in the adhesion step is, for example, preferably 120° C. to 250° C., more preferably 150° C. to 230° C., and still more preferably 200° C. to 220° C. If the heating temperature is higher than or equal to the above-described lower limit value, the insulation coatings 3 can be sufficiently cured and the adhesion strength of the laminated core can be further enhanced. If the heating temperature is lower than or equal to the above-described upper limit value, thermal deterioration of the insulation coatings 3 can be suppressed and the adhesion strength of the laminated core can be further enhanced.

The heating time in the adhesion step is affected by the size of the laminated core or the heating method, but is, for example, preferably 30 to 120 minutes, more preferably 45 to 100 minutes, and still more preferably 60 to 80 minutes. If the heating time is longer than or equal to the above-described lower limit value, the insulation coatings 3 can be sufficiently cured and the adhesion strength of the laminated core can be further enhanced. If the heating time is shorter than or equal to the above-described upper limit value, thermal deterioration of the insulation coatings 3 can be suppressed and the adhesion strength of the laminated core can be further enhanced.

The pressure when pressurizing the laminate is, for example, preferably 2 to 50 MPa, more preferably 3 to 30 MPa, and still more preferably 4 to 20 MPa. If the pressure when pressurizing the laminate is greater than or equal to the above-described lower limit value, the insulation coatings 3 can be sufficiently stuck together and the adhesion strength of the laminated core can be further enhanced. If the pressure when pressurizing the laminate is less than or equal to the above-described upper limit value, protrusion from end portions of the insulation coatings 3 can be suppressed and the stacking accuracy of the laminated core can be further improved.

The heating device 141 may not be placed in the outer circumference punching female die 142. That is, the laminated electrical steel sheets 40 may be taken out of the outer circumference punching female die 142 before being bonded to each other in the outer circumference punching female die 142. In this case, the outer circumference punching female die 142 may not have the heat insulating member 143. Furthermore, in this case, the stacked electrical steel sheets 40 before being bonded to each other may be sandwiched and held from both sides in the lamination direction using a tool not shown in the drawing, and then transported or heated.

The stator core 21 is completed through each of the above steps.

As described above, in the present invention, an insulation coating is formed on the surface of an electrical steel sheet using the coating composition for an electrical steel sheet in which the epoxy resin, the first curing agent (A), and the second curing agent (B) are combined at a specific ratio. Accordingly, it is possible to achieve both an excellent magnetic property (core iron loss) of a laminated core and excellent heat resistance that can maintain adhesion strength between electrical steel sheets even at a high temperature during driving.

The technical scope of the present invention is not limited to the embodiment, and various modifications can be made within the scope not departing from the gist of the present invention.

The shape of the stator core is not limited to the form shown in the embodiment. Specifically, the dimensions of the outer diameter and the inner diameter of a stator core, the lamination thickness, the number of slots, the dimensional ratio of teeth portions in the circumferential direction to the radial direction, the dimensional ratio in the radial direction between teeth portions and a core back portion, and the like can be arbitrarily designed according to the characteristics of a desired rotary electric machine.

A set of two permanent magnets 32 forms one magnetic pole in the rotor of the embodiment, but the present invention is not limited to this. For example, one permanent magnet 32 may form one magnetic pole, or three or more permanent magnets 32 may form one magnetic pole.

In the above-described embodiment, the permanent-magnet field electric motor has been described as an example of the rotary electric machine 10. However, the structure of the rotary electric machine 10 is not limited to the exemplary example provided below, and well-known various structures that have not been provided as exemplary examples below can also be adopted.

In the above-described embodiment, the permanent-magnet field electric motor has been described as an example of the rotary electric machine 10, but the present invention is not limited to this. For example, the rotary electric machine 10 may be a reluctance electric motor or an electromagnet field electric motor (winding-field electric motor).

In the above-described embodiment, the synchronous electric motor has been described as an example of the AC electric motor, but the present invention is not limited to this. For example, the rotary electric machine 10 may be an induction electric motor.

In the above-described embodiment, the AC electric motor has been described as an example of the rotary electric machine 10, but the present invention is not limited to this. For example, the rotary electric machine 10 may be a DC electric motor.

In the above-described embodiment, the electric motor has been described as an example of the rotary electric machine 10, but the present invention is not limited to this. For example, the rotary electric machine 10 may be a power generator.

In addition, it is possible to appropriately replace constituent elements in the embodiment with well-known constituent elements within the scope not departing from the gist of the present invention, and the above-described modification example may be appropriately combined.

EXAMPLES

Hereinafter, the effect of an aspect of the present invention will be specifically described with reference to examples. However, the conditions in the examples are merely an example of conditions adopted for confirming the effect and the feasibility of the present invention, and the present invention is not limited by the following description. The present invention can adopt various conditions as long as the gist of the present invention is not deviated and the object of the present invention is achieved.

[Raw Materials]

Raw materials used in the examples will be shown below.

(Epoxy Resin)

E1: Bisphenol A-type epoxy resin
E2: Bisphenol F-type epoxy resin
E3: Triphenylmethane-type epoxy resin (First Curing Agent)

A1: p-sec-Butylphenol
A2: p-Nonylphenol
A3: p-Dodecylphenol
A4: 2,6-di-sec-Butylphenol
A5: p-Propylphenol (Second Curing Agent)
H1: Phenol resol resin
H2: Phenol novolac resin
(Curing Agent (Comparison Target))
B1: Diaminodiphenylmethane
B2: Dicyandiamide
B3: 4-Methylhexahydrophthalic anhydride
(Compounding Agent)
M1: Acrylic resin (methyl methacrylate unit:isopropyl acrylate unit:styrene unit:2-ethylhexyl acrylate unit (molar ratio)=40:30:20:10, glass transition temperature: 17° C.)
M2: Acrylic resin (methyl methacrylate unit:n-butyl acrylate unit (molar ratio)=55:45, glass transition temperature: 10° C.)

[Magnetic Property]

10 rectangular electrical steel sheets (veneers) with a size of 55 mm×55 mm were cut out from each electrical steel strip of the examples, and laminated and bonded to each other under the conditions of a steel sheet temperature of 200° C., a pressure of 10 MPa, and a pressurization time of 1 hour to produce a laminated core. Regarding the obtained laminated core, the magnetic properties of the veneers in the rolling direction and the direction perpendicular to the rolling direction were measured through a veneer magnetism measurement method specified in JIS C2556(2015), and the average value of these values was obtained as a magnetic property. Regarding the magnetic property (magnetism), "W10/400 (W/kg)" was evaluated as iron loss. "W10/400" is iron loss when the frequency is 400 Hz and a maximum magnetic flux density is 1.0 T.

[Adhesion Strength]

Two rectangular electrical steel sheets (veneers) having a width of 30 mm and a length of 60 mm were cut out from each electrical steel strip of the examples. Subsequently, a coating composition for an electrical steel sheet was applied to the surface thereof, and distal portions having a width of 30 mm and a length of 10 mm were superposed on each other and pressurized to produce a sample for measurement. The pressurization conditions were a steel sheet temperature of 200° C., a pressure of 10 MPa, and a pressurization time of 1 hour.

The obtained sample was pulled at a tensile speed of 2 mm/minute, and maximum loads (N) until the sample was peeled off were measured in atmospheres of atmospheric temperatures of 25° C. and 150° C., and a numerical value obtained by dividing each maximum load (N) by the adhesion area was regarded as an adhesion strength (MPa).

<Curing Shrinkage Rate>

A coating composition for an electrical steel sheet was applied to the surface of each electrical steel strip of the examples, and a curing shrinkage rate was measured. The curing shrinkage rate was measured by changing the coating thickness according to JIS K 6941.

[Evaluation]

Each example was evaluated according to the following criteria. The smaller the iron loss, the more the stress strain applied to each electrical steel sheet is suppressed. The measurement results and the evaluation results are shown in Table 2. In the tables, values out of the scope of the invention are underlined.

[Criteria]

"Good": The adhesion strength at 25° C. is 5.0 MPa or more, the adhesion strength at 150° C. is 1.0 MPa or more, and a magnetic property is less than 12.0 W/kg.

"Bad": The adhesion strength at 25° C. is less than 5.0 MPa, the adhesion strength at 150° C. is less than 1.0 MPa, or a magnetic property is 12.0 W/kg or more.

Example 1

A non-oriented electrical steel sheet having a sheet thickness of 0.25 mm and a width of 100 mm and containing 3.0% of Si, 0.2% of Mn, 0.5% of Al, and a remainder of Fe and impurities by mass % was used as a base steel sheet.

The components shown in Table 1 were mixed with each other to prepare each coating composition for an electrical steel sheet. The obtained coating composition for an electrical steel sheet was applied to the surface of the base steel sheet and baked at 160° C. for 15 seconds to obtain each electrical steel strip having an insulation coating with an average thickness of 3 μm.

Examples 2 to 10 and Comparative Examples 1 to 9

Electrical steel strips were obtained in the same manner as in Example 1 except that the composition and baking conditions of the coating composition for an electrical steel sheet were changed as shown in Table 1.

The compositions and the baking conditions of the coating compositions for an electrical steel sheet of the examples are shown in Table 1. The evaluation results of the magnetic property (magnetism) and the adhesion strength of the examples are shown in Table 2.

TABLE 1

| | Epoxy resin | | First curing agent (A) | | Second curing agent (B) | | | Compounding agent | | Baking conditions | | |
|---|---|---|---|---|---|---|---|---|---|---|---|---|
| | Type | Parts by mass | Type | Parts by mass | Type | Parts by mass | A/B | Type | Parts by mass | Reaching temperature [° C.] | Time [second] | Curing shrinkage rate (%) |
| Example 1 | E1 | 100 | A1 | 5.0 | H1 | 50.0 | 0.1 | M1 | 20 | 160 | 15 | 4.1 |
| Example 2 | E1 | | A1 | 10.0 | H1 | 20.0 | 0.5 | M2 | 10 | 160 | 15 | 3.9 |
| Example 3 | E1 | | A2 | 4.0 | H1 | 65.0 | 0.06 | M1 | 20 | 180 | 10 | 4.6 |
| Example 4 | E2 | | A2 | 4.0 | H2 | 135.0 | 0.03 | M2 | 10 | 180 | 10 | 4.5 |
| Example 5 | E2 | | A3 | 16.0 | H2 | 5.0 | 3.2 | M1 | 20 | 200 | 10 | 4.2 |
| Example 6 | E3 | | A3 | 14.0 | H2 | 10.0 | 1.4 | M2 | 10 | 200 | 10 | 3.8 |
| Example 7 | E3 | | A4 | 18.0 | H2 | 5.0 | 3.6 | — | — | 140 | 30 | 3.6 |
| Example 8 | E1 | | A5 | 2.0 | H1 | 145.0 | 0.01 | M2 | 25 | 160 | 20 | 4.3 |

TABLE 1-continued

| | Epoxy resin | | First curing agent (A) | | Second curing agent (B) | | | Compounding agent | | Baking conditions | | |
|---|---|---|---|---|---|---|---|---|---|---|---|---|
| | Type | Parts by mass | Type | Parts by mass | Type | Parts by mass | A/B | Type | Parts by mass | Reaching temperature [° C.] | Time [second] | Curing shrinkage rate (%) |
| Example 9 | E1 | | A3 | 2.0 | H1 | 8.0 | 0.25 | M2 | 20 | 140 | 20 | 4.2 |
| Example 10 | E1 | | A4 | 2.0 | H1 | 6.0 | 0.33 | M2 | 20 | 140 | 20 | 4.0 |
| Comparative Example 1 | E2 | | A1 | 0.5 | H1 | 100.0 | 0.01 | M1 | 20 | 160 | 20 | 4.9 |
| Comparative Example 2 | E1 | | A2 | 0.3 | H1 | 100.0 | 0.003 | M1 | 20 | 160 | 15 | 5.3 |
| Comparative Example 3 | E1 | | A1 | 23.0 | H1 | 50.0 | 0.46 | M1 | 20 | 160 | 15 | 13.2 |
| Comparative Example 4 | E1 | | A2 | 40.0 | H2 | 50.0 | 0.8 | M1 | 20 | 140 | 25 | 11.4 |
| Comparative Example 5 | E2 | | B1 | 4.0 | H2 | 80.0 | 0.05 | M2 | 10 | 140 | 25 | 7.2 |
| Comparative Example 6 | E2 | | B2 | 4.0 | H2 | 120.0 | 0.03 | M2 | 10 | 140 | 25 | 8.8 |
| Comparative Example 7 | E2 | | B3 | 3.0 | H1 | 120.0 | 0.03 | M2 | 10 | 140 | 25 | 9.4 |
| Comparative Example 8 | E2 | | A1 | 5.0 | — | — | — | M1 | 20 | 160 | 15 | 9.7 |
| Comparative Example 9 | E2 | | — | — | H1 | 120.0 | — | M1 | 20 | 160 | 15 | 10.4 |

TABLE 2

| | Adhesion strength [MPa] | | Magnetism [W/kg] | |
|---|---|---|---|---|
| | 25° C. | 150° C. | W10/400 | Evaluation |
| Example 1 | 10.0 | 2.0 | 10.8 | Good |
| Example 2 | 11.0 | 3.0 | 11.2 | Good |
| Example 3 | 9.0 | 2.0 | 10.9 | Good |
| Example 4 | 8.0 | 1.0 | 11.0 | Good |
| Example 5 | 8.0 | 1.0 | 11.1 | Good |
| Example 6 | 9.0 | 2.0 | 11.2 | Good |
| Example 7 | 7.0 | 1.0 | 10.8 | Good |
| Example 8 | 6.0 | 1.0 | 10.8 | Good |
| Example 9 | 7.5 | 1.5 | 11.1 | Good |
| Example 10 | 8.5 | 1.5 | 11.2 | Good |
| Comparative Example 1 | 8.0 | 0.7 | 11.8 | Bad |
| Comparative Example 2 | 7.0 | 0.6 | 11.3 | Bad |
| Comparative Example 3 | 12.0 | 3.0 | 12.4 | Bad |
| Comparative Example 4 | 12.0 | 3.0 | 12.3 | Bad |
| Comparative Example 5 | 6.0 | 0.4 | 11.4 | Bad |
| Comparative Example 6 | 5.0 | 0.4 | 11.1 | Bad |
| Comparative Example 7 | 6.0 | 0.3 | 11.0 | Bad |
| Comparative Example 8 | 13.0 | 0.0 | 13.2 | Bad |
| Comparative Example 9 | 12.0 | 1.0 | 12.6 | Bad |

As shown in Table 2, in Examples 1 to 10 in which an epoxy resin, a first curing agent (A), and a second curing agent (B) were combined at a specific ratio, a sufficient adhesion strength can be ensured even at 150° C., and the examples had excellent heat resistance and an excellent magnetic property.

On the other hand, in Comparative Examples 1 to 4 in which the amount of first curing agent is out of the scope of the present invention, Comparative Examples 5 to 7 and 9 containing no first curing agent, and Comparative Example 8 containing no second curing agent, both the heat resistance and the magnetic property could not be achieved.

INDUSTRIAL APPLICABILITY

According to the present invention, both the magnetic property and the heat resistance of a laminated core can be achieved. Accordingly, the industrial applicability is significant.

BRIEF DESCRIPTION OF THE REFERENCE SYMBOLS

1 Material
2 Base steel sheet
3 Insulation coating
10 Rotary electric machine
20 Stator
21 Stator core
40 Electrical steel sheet

What is claimed is:

1. A coating composition for an electrical steel sheet comprising:

an epoxy resin;

a first curing agent (A) including an alkylphenol; and a second curing agent (B) including a phenol resol resin, wherein an amount of the first curing agent (A) is 1.0 part by mass to 20.0 parts by mass with respect to 100 parts by mass of the epoxy resin.

2. The coating composition for an electrical steel sheet according to claim 1, wherein the alkylphenol includes either one or both of a monoalkylphenol having an alkyl group with 2 to 20 carbon atoms and a dialkylphenol having an alkyl group with 2 to 20 carbon atoms.

3. The coating composition for an electrical steel sheet according to claim 1, wherein an amount of the second curing agent (B) is 5.0 parts by mass to 150.0 parts by mass with respect to 100 parts by mass of the epoxy resin.

4. The coating composition for an electrical steel sheet according to claim 3, wherein a mass ratio represented by (amount of the first curing agent (A))/(amount of the second curing agent (B)) is 0.01 to 4.0.

5. The coating composition for an electrical steel sheet according to claim 1, wherein a curing shrinkage rate is 15% or less.

6. The coating composition for an electrical steel sheet according to claim 1, wherein a mass ratio represented by (amount of the first curing agent (A))/(amount of the second curing agent (B)) is 0.01 to 4.0.

7. An electrical steel sheet comprising:

an insulating coating containing the coating composition for an electrical steel sheet according to claim 1 on a surface.

8. A laminated core, wherein a plurality of the electrical steel sheets according to claim 7 are laminated and caused to adhere together.

9. A rotary electric machine comprising:

the laminated core according to claim 8.

* * * * *